No. 119,619

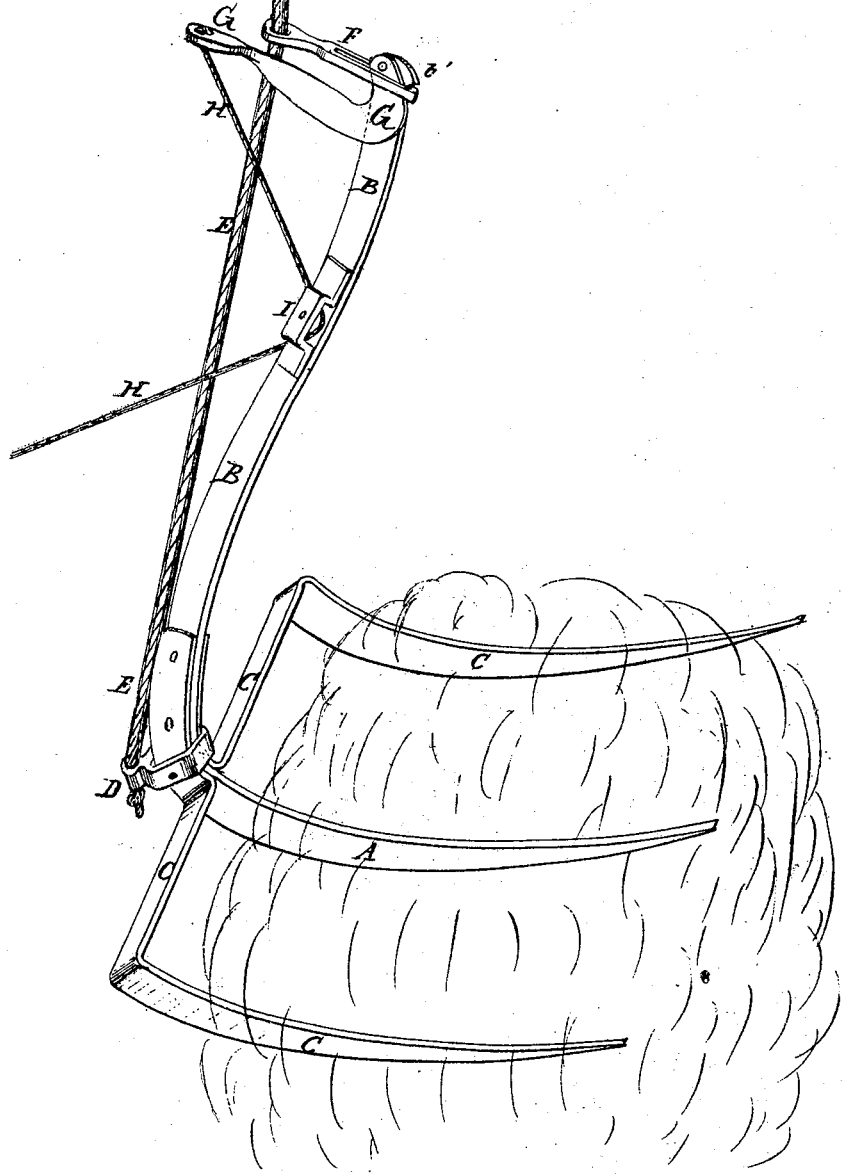

UNITED STATES PATENT OFFICE.

JOHN C. LAMPMAN, OF BALTIMORE, MICHIGAN.

IMPROVEMENT IN HORSE HAY-FORKS.

Specification forming part of Letters Patent No. 119,619, dated October 3, 1871.

*To all whom it may concern:*

Be it known that I, JOHN C. LAMPMAN, of Baltimore, in the county of Barry and State of Michigan, have invented a new and useful Improvement in Horse Hay-Fork; and I do hereby declare that the following is a full, clear, and exact description thereof, which will enable others skilled in the art to make and use the same, reference being had to the accompanying drawing forming part of this specification, in which the figure is a perspective view of my improved horse hay-fork.

My invention has for its object to furnish an improved horse hay-fork, strong, durable, simple in construction, and effective in operation, and which shall be so constructed that it may be conveniently repaired should any of its parts be accidentally broken; and it consists in the construction and combination of various parts of the fork, as hereinafter more fully described.

A is the central tine, the rear end B of which is bent and extended upward to serve as the shank or standard of the fork. C are the side tines, the rear ends of which are bent inward, and are welded or otherwise securely attached to the central tine A at or near its bend, the connection being further strengthened by the band that forms the eye D, to which the hoisting-rope E is attached. Upon the upper end of the shank B is formed a notch or shoulder, $b'$, to receive a loop or link, F, attached to the hoisting-rope E. G is the trip-lever, which is pivoted to the upper end of the standard B, and is curved, as shown in the figure, to serve as a cam to push the link E out of the notch $b'$ to discharge the load from the fork. The forward or curved end of the lever G passes up through the loop, link, or ring F, and to its other or rearwardly-projecting end is attached the trip-rope H. The trip-rope H passes over a guide-pulley, I, pivoted to the shank or standard B, so that it may always act in the proper direction upon the trip-lever G whatever may be the position from which it is operated.

Having thus described my invention, I claim as new, and desire to secure by Letters Patent—

An improved horse hay-fork, consisting of the tines A C, shank or standard B, notch or shoulder $b'$, loop or link F, trip-lever G, hoisting-rope E, and guide-pulley I, said parts being constructed, arranged, and operating substantially as herein shown and described, and for the purpose set forth.

JOHN C. LAMPMAN.

Witnesses:
WM. FREEMAN,
AMANDA HOWE,
P. J. LAMPMAN.